United States Patent [19]
Sanders et al.

[11] 3,911,028
[45] Oct. 7, 1975

[54] 2-(4-HYDROXY-4-METHYLPENTYL)NORBORNADIENE AND PROCESS FOR PREPARING SAME

[75] Inventors: James Milton Sanders, Eatontown; Manfred Hugo Vock, Locust, both of N.J.

[73] Assignee: International Flavors & Fragrances Inc., New York, N.Y.

[22] Filed: Jan. 7, 1975

[21] Appl. No.: 539,093

Related U.S. Application Data
[62] Division of Ser. No. 461,703, April 17, 1974, Pat. No. 3,886,289.

[52] U.S. Cl. ........................................ 260/617 F
[51] Int. Cl.² ........................................ C07C 35/30
[58] Field of Search ........................... 260/617 F

[56] References Cited
UNITED STATES PATENTS
3,483,254  12/1969  Shen et al. ................. 260/617 F
3,662,008  5/1972  Kretchman ................ 260/617 F Primary Examiner—James O. Thomas, Jr.
Assistant Examiner—James H. Reamer
Attorney, Agent, or Firm—Arthur L. Liberman, Esq.; Harold Haidt, Esq.

[57] ABSTRACT

The novel compound, 2-(4-hydroxy-4-methylpentyl) norbornadiene, process for preparing said compound comprising the steps of:
i. effecting a reaction between cyclopentadiene and a 5-halo-1-pentyne to form a 2-(3-halo-1-propyl)-2,5-norbornadiene;
ii. reacting the halopropyl norbornadiene with magnesium to form a Grignard reagent;
iii. reacting the Grignard reagent with acetone to form a Grignard complex; and
iv. hydrolizing the complex to yield the desired product.

2-(4-hydroxy-4-methylpentyl) norbornadiene produces in food flavorings the aroma of full ripened raspberries with the taste of the ripe raspberry and its seedy, raspberry kernel note.

1 Claim, No Drawings

2-(4-HYDROXY-4-METHYLPENTYL)NORBORNADIENE AND PROCESS FOR PREPARING SAME

This application is a division of applicants' copending application Ser. No. 461,703, filed on Apr. 17, 1974 now U.S. Pat. No. 3,886,289.

BACKGROUND OF THE INVENTION

The present invention relates to 2-(4-hydroxy-4-methylpentyl)norbornadiene and processes for preparing same.

There has been considerable work performed relating to substances which can be used to impart (or enhance) flavors to (or in) various consumable materials including foodstuffs. These substances are used to diminish natural materials, some of which may be in short supply, and to provide more uniform properties in finished products. Authentic raspberry-type flavor notes, particularly flavors having the aroma of full ripened raspberries with the taste of the ripe fruit and its seedy, raspberry kernel note, are particularly desirable for uses in raspberry flavoring compositions and foodstuffs.

Fenaroli's Handbook of Flavor Ingredients published by the Chemical Rubber Company of Cleveland, Ohio, (1971), sets forth on pages 666 and 667 components of natural raspberry aroma and a recommended raspberry flavor. Although it is stated therein on page 666 that 4-(p-hydroxyphenyl)-2-butanone exhibits the characteristic raspberry taste and odor, there is no suggestion in this publication or any other publication in the prior art that there exist materials having the aroma of full ripened raspberries with a taste of the ripe fruit and its seedy, raspberry kernel note.

Norbornane derivatives are known in the prior art for their uses in flavors and fragrances. Fenaroli's Handbook of Flavor Ingredients, cited supra, discloses at page 404 the flavor use of fenchyl alcohol (1,3,3,-trimethyl-2-norbornanol) having the structure:

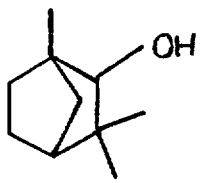

This compound is indicated to have a camphor-like odor with citrus notes and a bitter lime-like flavor. Norbornadiene (bicyclo-[2,2,1]hepta-2,5-diene) having the structure:

is disclosed as having a very diffusive, gassy-piney, camphoraceous-woody odor by Arctander, "Perfume and Flavor Chemicals (Aroma Chemicals)" 1969, Volume II, No. 2387. The Arctander publication states that norbornadiene has "occasionally been used in Pine needle fragrances to improve the diffusiveness of the fragrance, and to lend initial power and short life to fragrances which are intended for 'short effect' purposes".

The Arctander publication states that norbornadiene is produced by reaction of Cyclopentadiene and Acetylene in a Diels-Alder type reaction.

The following publications set forth the perfumery uses of compounds having the indicated structures:

U.S. Pat. No. 3,580,954 issued May 25, 1971

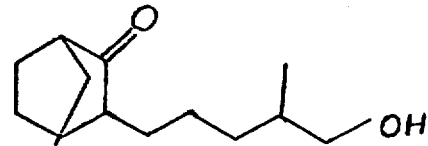

U.S. Pat. No. 3,780,109 issued Dec. 18, 1973

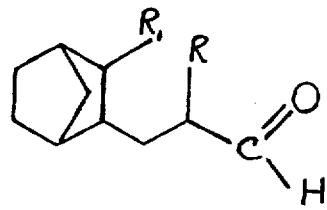

wherein $R_1$ represents hydrogen or methyl and R represents lower alkyl.

U.S. Pat. No. 3,662,008 issued May 9, 1972

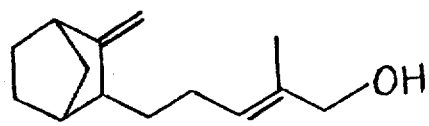

U.S. Pat. No. 3,673,261 issued June 27, 1972

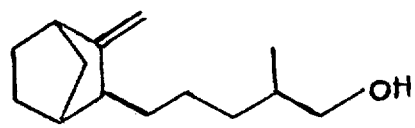

THE INVENTION

It has now been discovered that the novel compound 2-(4-hydroxy-4-methylpentyl)norbornadiene, prepared by a novel process, can be used to produce novel solid and liquid foodstuff and food flavoring compositions having the aroma of full ripened raspberries with the taste of the ripe fruit and its seedy, raspberry kernel note.

2-(4-hydroxy-4-methylpentyl)norbornadiene has the structure:

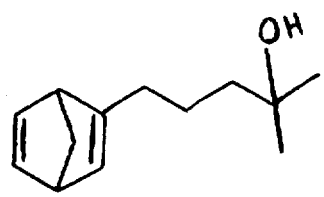

For the purposes of our invention, the foregoing structure is intended to cover the "dextro", "laevo"

and mixture of dextro and laevo stereoisomers of 2-(4-hydroxy-4-methylpentyl) norbornadiene.

The novel process for the preparation of 2-(4-hydroxy-4-methylpentyl)norbornadiene of our invention involves four reactions, to wit:

i. reacting cyclopentadiene with a 5-halo-1-pentyne such as 5-chloro-1-pentyne to form a 2-(3-halo-1-propyl)-2,5-norbornadiene such as 2-(3-chloro-1-propyl)-2,5-norbornadiene according to the following reaction:

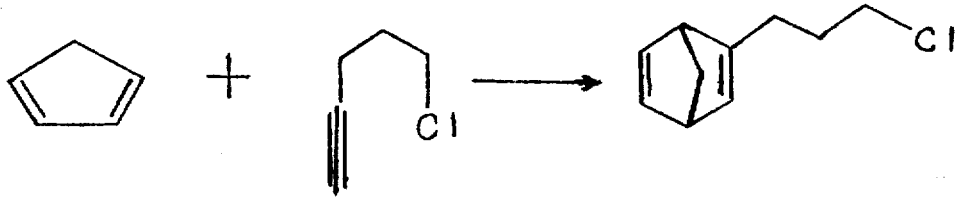

ii. forming a Grignard reagent from the halopropyl norbornadiene derivative;
iii. reacting the Grignard reagent with acetone to form a Grignard complex; and
iv. hydrolyzing the complex to form the desired product.

Reactions (ii), (iii), and (iv) are illustrated by the following reaction sequence.

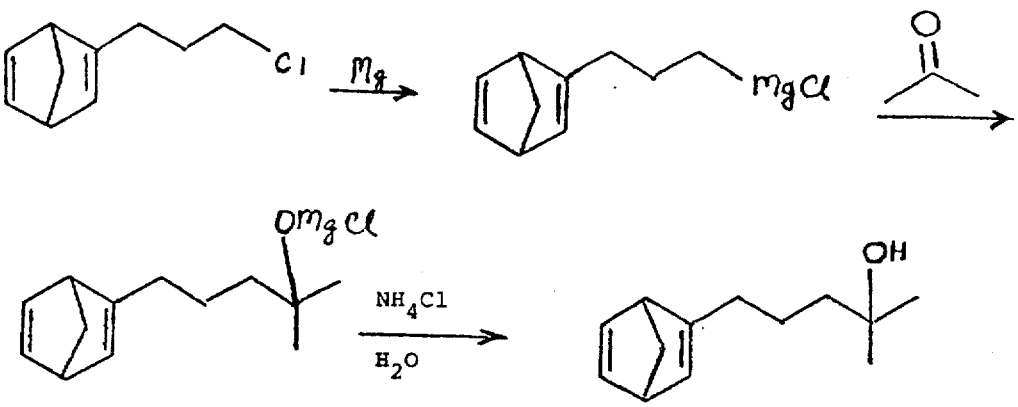

The first reaction is preferably carried out using a cyclopentadiene precursor, namely dicyclopentadiene which can be handled more easily than cyclopentadiene itself and which decomposes to cyclopentadiene spontaneously during the reaction. The reaction may be carried out in the presence of an inert solvent such as toluene. The mole ratio of cyclopentadiene: 5-chloro-1-pentyne is preferably 1:1. Although 5-chloro-1-pentyne is a preferred reactant, 5-bromo-1-pentyne can also be used and is to be considered within the scope of our invention. The reaction temperature range is 160°C–200°C; preferably 175°–185°C. The time of reaction varies from 10–20 hours depending upon the temperature of reaction. Higher temperatures of reaction give rise to shorter required time for completion of the reaction. In view of the required temperature range of reaction, it is required that this reaction be carried out in a pressure vessel, e.g. an autoclave.

At the termination of the reaction of the cyclopentadiene with the halopropyl acetylene the reaction product, namely 2-(3-halo-1-propyl)-2,5-norbornadiene is distilled under vacuum using a fractionating column.

The 2-(3-halo-1-propyl)-2,5-norbornadiene is then reacted with magnesium, thereby forming a Grignard reagent having the structure:

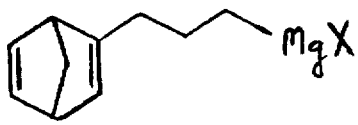

wherein X is either chloro or bromo. The formation of the Grignard reagent is carried out in the presence of a solvent such as tetrahydrofuran or diethyl ether. If necessary, the Grignard reaction is initiated using such materials as methyl iodide.

In the same reaction medium, preferably, this Grignard reagent is then reacted with acetone to form a Grignard complex having the structure:

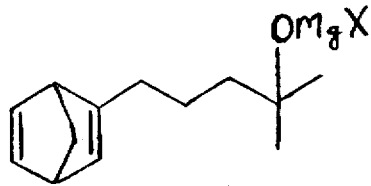

wherein X is defined as above. The reaction to form this Grignard complex takes place at atmospheric pressure at reflux, and the temperature is dependant upon the solvent used.

The ratio of the reactant:solvent is of the order of 1:5, although reactant:solvent weight ratios of 1:2 up to 1:10 are workable. The mole ratio of acetone:Grignard complex is preferably 1:1, although an excess of acetone is workable, and mole ratios of acetone:Grignard complex of 2:1 or higher are quite suitable.

After formation of the Grignard complex, this Grignard complex is then hydrolyzed using weak acid, e.g. ammonium chloride in saturated aqueous solution. The mole ratio of Grignard complex:weak acid is such that all of the Grignard complex is decomposed or hydrolyzed.

At the termination of the reaction the desired product contained in the reaction mass is purified by first adsorbing it onto a material such as silica gel, separating the silica gel having the 2-(4-hydroxy-4-methylpentyl)norbornadiene adsorbed thereon from the rest of the reaction mass and washing it with a solvent such as hexane to remove any starting materials present, e.g. unreacted dicyclopentadiene. The 2-(4-hydroxy-4-methylpentyl)norbornadiene is then removed from the silica gel by washing with solvent such as methanol. The 2-(4-hydroxy-4-methylpentyl)norbornadiene methanol solution is then concentrated under reduced pressure yielding 2-(4-hydroxy-4-methylpentyl)norbornadiene product which is in such purity and free of reactants so that it can be used as a flavor ingredient.

When the 2-(4-hydroxy-4-methylpentyl)norbornadiene of our invention is used as a food flavor adjuvant, the nature of the co-ingredients included with said 2-(4-hydroxy-4-methylpentyl)norbornadiene in formulating the product composition will also serve to alter the organoleptic characteristics of the ultimate foodstuffs treated therewith. As used herein, in regard to flavors, the term "alter" in its various forms means "supplying or imparting flavor character or notes to otherwise bland, relatively tasteless substance or augmenting the existing flavor characteristic where a natural flavor is deficient in some regard or supplementing the existing flavor impression to modify its quality, character or taste".

As used herein, the term "foodstuff" includes both solid and liquid ingestible materials which usually do but need not have nutritional value. Thus, foodstuffs include soups, convenience foods, beverages, dairy products, candies, fruits, cereals, soft drinks, snacks and the like.

Substances suitable for use herein as co-ingredients or flavoring adjuvants are well known in the art for such use being extensively described in the relevant literature. Apart from the requirement that any such material be "ingestibly" acceptable and thus non-toxic or otherwise non-deleterious, nothing particularly critical resides in selection thereof. Accordingly, such materials which may in general be characterized as flavoring adjuvants or vehicles comprise broadly stabilizers, thickeners, surface active agents, conditioners, other flavorants and flavor intensifiers.

Stabilizer compounds include preservatives, e.g., sodium chloride, antioxidants, e.g., calcium and sodium ascorbate, ascorbic acid, butylated hydroxyanisole (mixture of 2 and 3 tertiary butyl-4-hydroxyanisole), butylated hydroxy toluene (2,6-di-tertiary-butyl-4-methyl phenol), propyl gallate and the like, and sequestrants, e.g., citric acid.

Thickener compounds include carriers, binders, protective colloids, suspending agents, emulsifiers and the like, e.g., agaragar; carrageenan; cellulose and cellulose derivatives such as carboxymethyl cellulose and methyl cellulose; natural and synthetic gums such as gum arabic, gum tragacanth; gelatine, proteinaceous materials; lipids; carbohydrates; starches pectins, and emulsifiers, e.g., mono- and diglycerides of fatty acids, skim milk powder, hexoses, pentoses, disaccharides, e.g., sucrose, corn syrup solids and the like.

Surface active agents include emulsifying agents, e.g., fatty acids such as capric acid, caprylic acid, palmitic acid, myristic acid and the like, mono- and diglycerides of fatty acids, lecithin, defoaming and flavor-dispersing agents such as sorbitan monostearate, potassium stearate, hydrogenated tallow alcohol and the like.

Conditioners include compounds such as bleaching and maturing agents, e.g., benzoyl peroxide, calcium peroxide, hydrogen peroxide and the like; starch modifiers such as peracetic acid, sodium chlorite, sodium hypochlorite, propylene oxide, succinic anhydride and the like, buffers and neutralizing agents, e.g., sodium acetate, ammonium bicarbonate, ammonium phosphate, citric acid, lactic acid, vinegar and the like; colorants, e.g., carminic acid, cochineal, turmeric and curcumin and the like; firming agents such as aluminum sodium sulfate, calcium chloride and calcium gluconate; texturizers; anti-caking agents, e.g., aluminum calcium sulfate and tribasic calcium phosphate; enzymes; yeast foods, e.g., calcium lactate and calcium sulfate; nutrient supplements, e.g., iron salts such as ferric phosphate, ferrous gluconate and the like, riboflavin, vitamins, zinc sources such as zinc chloride, zinc sulfate and the like.

Other flavorants and flavor intensifiers include organic acids, e.g., acetic acid, butyric acid, caproic acid, caprylic acid, formic acid, 2-Hexenoic acid, 3-Hexenoic acid, isobutyric acid, isovaleric acid, propionic acid, and valeric acid; Ketones and aldehydes, e.g., acetaldehyde, acetone, acetyl methyl carbinol, acrolein, diacetyl, $\beta,\beta$-Dimethylacrolein, Hexanal, 2-Hexenal, cis-3-Hexenal, 4(p-Hydroxyphenyl)-2-butanone, $\alpha$-Ionone, $\beta$-Ionone, and 2-Pentenal; alcohols, such as 1-Butanol, trans-2-Buten-1-ol, Ethanol, Geraniol, 1-Hexanol, cis-3-Hexen-1-ol, 3-Methyl-3-buten-1-ol, 1-Pentanol, 1-Penten-3-ol; esters, such as Butyl acetate, Ethyl acetate, Ethyl butyrate, Ethyl crotonate, Ethyl propionate, 2-Hexenyl acetate, 2-Hexenyl butyrate, Hexyl acetate, Hexyl butyrate, Isoamyl acetate, Isopropyl butyrate, Methyl butyrate, Methyl caproate, Methyl caprylate, Propyl acetate, Amyl acetate, Amyl butyrate, Benzyl salicylate, Dimethyl anthranilate, Ethyl methylphenylglycidate, Ethyl succinate, Isobutyl cinnamate and Terpenyl acetate; Essential Oils such as Jasmine absolute, Rose absolute, Orris absolute, Lemon essential oil and Vanilla; lactones; sulfides, e.g. methyl sulfide and other materials such as Maltol and Citral, as well as natural raspberry oil.

The specific flavoring adjuvants selected for use may be either solid or liquid, depending upon the desired physical form of the ultimate product, i.e., foodstuff, whether simulated or natural, and should, in any event, be capable of providing an environment in which the 2-(4-hydroxy-4-methylpentyl)norbornadiene can be disbursed or admixed to provide a homogeneous medium. In addition, selection of one or more adjuvants, as well as the quantities thereof, will depend upon the precise organoleptic raspberry character desired in the finished product. Thus, in the case of flavoring compositions, ingredient selection will vary in accordance with the foodstuff to which the flavor and aroma are to be imparted. In contradistinction, in the preparation of solid products, e.g., simulated foodstuffs, ingredients capable of providing normally solid compositions should be selected such as various cellulose derivatives.

As will be appreciated by those skilled in the art, the amount of 2-(4-hydroxy-4-methylpentyl) norbornadiene employed in a particular instance can vary over a relatively wide range whereby its desired organoleptic effects (having reference to the nature of the product) are achieved. All parts and percentages given herein are by weight unless otherwise specified. Thus, correspondingly greater amounts would be necessary in those instances wherein the ultimate food composition to be flavored is relatively bland to the taste, whereas relatively minor quantities may suffice for the purposes of enhancing the composition merely deficient in natural flavor or aroma. Thus, the primary requirement is that amount which is effective, i.e., sufficient to alter the organoleptic characteristics of the parent composition, whether foodstuff per se or flavoring composition. Thus, the use of insufficient quantities of 2-(4-hydroxy-4-methylpentyl)norbornadiene will, of course, substantially vitiate any possibility of obtaining the desired results while excess quantities prove needlessly costly and in extreme cases, may disrupt the flavor-aroma balance, thus proving self-defeating. Accordingly, the terminology "effective amount" and "sufficient amount" is to be accorded a significance in the context of the present invention consistent with the obtention of desired flavoring effects.

Thus and with respect to ultimate food compositions, it has been found that quantities of 2-(4-hydroxy-4-methylpentyl)norbornadiene ranging from a small but effective amount, e.g., 0.02 parts per million up to about 50 parts per million by weight based on total composition are suitable. Concentrations in excess of the maximum quantity stated are not normally recommended since they fail to provide commensurate enhancement of organoleptic properties. In those cases wherein the 2-(4-hydroxy-4-methylpentyl)norbornadiene is added to the foodstuff as an integral component of the flavoring composition, it is, of course, essential that the total quantity of flavoring composition employed be sufficient to yield an effective 2-(4-hydroxy-4-methylpentyl)norbornadiene concentration in the foodstuff product.

Food flavoring compositions prepared in accordance with the present invention preferably contain 2-(4-hydroxy-4-methylpentyl)norbornadiene in concentrations ranging from about 0.05% up to about 10% by weight based on a total weight of said flavoring composition.

The compositions described herein can be prepared according to conventional techniques well known as typified by cake batters and fruit juices and can be formulated by merely admixing the involved ingredients within the proportions stated in a suitable blender to obtain the desired consistency, homogeneity of dispersion, etc. Alternatively, flavoring compositions in the form of particulate solids can be conveniently prepared by admixing the 2-(4-hydroxy-4-methylpentyl)norbornadiene with, for example, gum arabic, gum tragacanth, carrageenan and the like and thereafter spray-drying the resultant mixture whereby to obtain the particulate solid product. Prepared flavor mixes in powder form e.g., a raspberry flavored powder are obtained by mixing dried solid, components, e.g., starch, sugar and the like and 2-(4-hydroxy-4-methylpentyl) norbornadiene in a dry blender until the requisite degree of uniformity is achieved.

It is presently preferred to combine the 2-4-hydroxy-4-methylpentyl)norbornadiene with the following adjuvants:

Parahydroxybenzyl acetone
Vanillin
Maltol
α-Ionone
β-Ionone
Isobutyl acetate
Ethyl butyrate
Dimethyl sulfide
Acetic acid
Acetaldehyde
4-(2,6,6-trimethyl-1,3-cyclohexadien-1-yl)-2-butanone
4-(6,6-dimethyl-2-methylene-3-cyclohexen-1-yl)-2-butanone The following examples are given to illustrate embodiments of our invention as it is presently preferred to practice it. It will be understood that these examples are illustrative, and the invention is not to be considered as restricted thereto except as indicated in the appended claims.

EXAMPLE I

PREPARTATION OF 2-(3-CHLORO-1-PROPYL)-2,5-NORBORNADIENE

Reaction

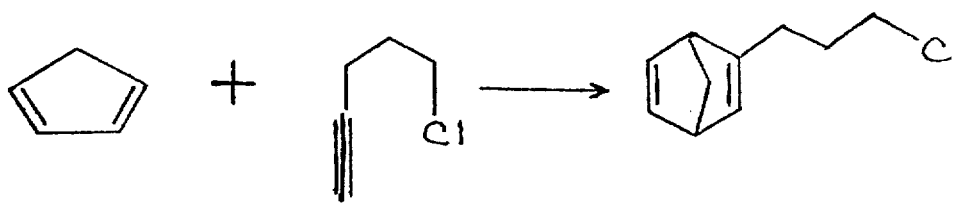

A mixture of 70 grams of dicyclopentadiene, 100 grams of 5-chloro-1-pentyne, 10 grams toluene, and 1 gram Ionol is stirred in a 300 ml autoclave at 180°C for 16 hours. The autogenous pressure during the reaction is 20–50 psig. The reaction mass from the autoclave is distilled under reduced pressure to give 19 grams of material, bp 88°–94°C, at 1–4 mm Hg which contained approximately 45% 2-(3-chloro-1-propyl)-2,5-norbornadiene according to GLC (10 ft. × 1/8 in., 5% OV 101,100°–200°C at 10°c/min.). The remainder is a mixture of dimers and trimers of cyclopentadiene. The structure is confirmed by mass spectroscopy (m/e 168,105,91,77,66,39,27).

Ionol is a registered trademark identifying the compound, 2,6-di-t-butyl-4-methyl phenol.

EXAMPLE II

PREPARTION OF 2-(4-HYDROXY-4-METHYLPENTYL)-NORBORNADIENE

Reaction

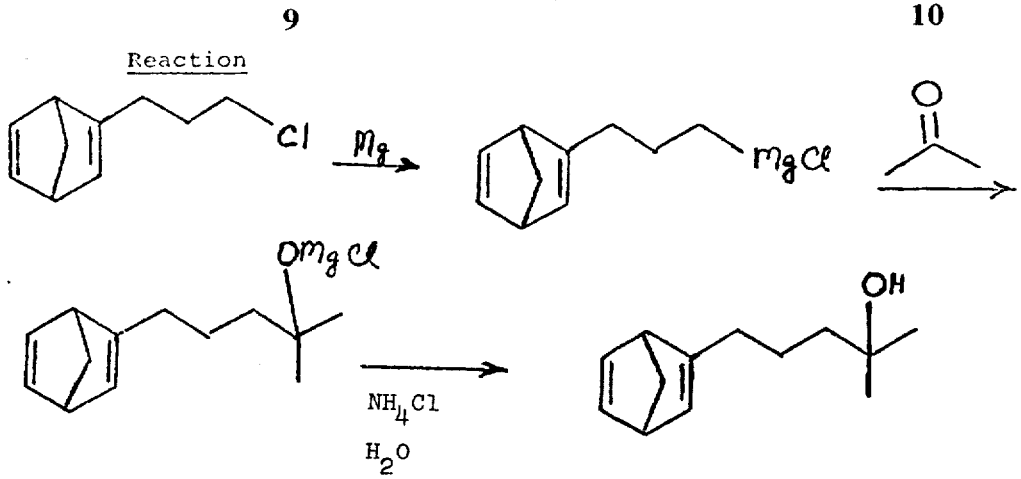

2-(3-chloro-1-propyl)-norbornadiene (10 g, 45% by GLC) is added to 0.7 grams of magnesium turnings and 30 ml of diethyl ether. In order to initiate the reaction, a few drops of methyl iodide is added and the ether is distilled off while adding 25 ml of tetrahydrofuran. The resulting mixture is stirred at reflux for 2.5 hours. Acetone (10 grams) is added and the mass is refluxed an additional 30 minutes. The resulting Grignard complex is decomposed by addition of 5 ml of saturated ammonium chloride solution. The organic layer is distilled to give 4.5 grams of material, bp 100°C at 1.5 mm Hg which is a mixture of the desired product and dicyclopentadiene. The mixture is dissolved in 10 ml of hexane and stirred for approximately 30 minutes with 10 grams of silica gel to adsorb the tertiary alcohol. The mixture is filtered and the silica gel is washed with hexane to remove all of the dicyclopentadiene. The 2-(4-hydroxy-4-methylpentyl)-norbornadiene is then removed from the silica gel by washing with several 10 gram portions of methanol. The methanol is removed under reduced pressure to give 2grams of 2-(4-hydroxy-4-methylpentyl)-norbornadiene.

EXAMPLE III

RASPBERRY FLAVOR

The following formulation is prepared:

| Ingredient | Parts by Weight |
|---|---|
| para-hydroxybenzyl acetone | 4 |
| vanillin | 1 |
| maltol | 2 |
| α-ionone (10% in propylene glycol) | 2 |
| isobutyl acetate | 20 |
| ethyl butyrate | 5 |
| dimethyl sulfide | 1 |
| acetic acid | 10 |
| acetaldehyde | 15 |
| propylene glycol | 940 |

2-(4-hydroxy-4-methylpentyl)norbornadiene produced according to the process of Example II is added to a portion of the above formulation at the rate of 0.1%. The formulation with the norboradiene derivative is compared with a formulation without said norbornadiene derivative at the rate of 0.01% (100 ppm) in water by a bench panel. The flavor containing the norbornadiene derivative is determined to have the aroma of full ripened raspberries with the taste of the ripe fruit and its seedy, raspberry kernel note. These notes are not present in the formulation without said norbornadiene derivative.

EXAMPLE IV

The following mixture is prepared:

| Ingredients | Parts by Weight |
|---|---|
| Natural Raspberry Concentrate Juice | 2½% |
| Water | 85% |
| Sugar syrup (37.5° Baume) | 12½% |

The ripened raspberry and seedy, raspberry kernel note of this raspberry juice is imparted in increased strength by addition of 2-(4-hydroxy-4-methylpentyl)-norbornadiene at the rate of from 0.02 parts per million up to 10 parts per million.

EXAMPLE V

To the raspberry formulation of Example III, 2-(4-hydroxy-4-methylpentyl)norbornadiene at the rate of 0.2% is added. This material is then called the "test composition". The raspberry formulation withou 2-(4-hydroxy-4-methylpentyl)norbornadiene is called the "control composition".

The test and control compositions are added to the food products described hereinafter in the proportions shown for 10 kilograms of material to be flavored:

Pudding       5–10 grams (0.15–.1%)
Cooked sugar  15–20 grams (.15–2%)

Cooked sugar — 100 ml of sugar syrup (prepared by dissolving 1 kilogram of sucrose in 600 ml of water) and 20 grams of glucose are mixed together and slowly heated to 145°C. The flavor is added and the mass allowed to cool and harden.

Pudding — To 500 ml of warmed milk are added with stirring a mixture of 60 grams sucrose and 3 grams of pectin. The mixture is boiled for a few seconds and the flavor is added. The mixture was allowed to cool.

The finished foodstuff samples are tested by a panel of trained persons who express their views about the flavor of the samples. All member of the panel prefer the test samples having a more distinguished ripened raspberry aroma with taste of the ripe raspberries and its seedy kernel note.

What is claimed is:

1. 2-(4-hydroxy-4-methylpentyl) norbornadiene having the structure:

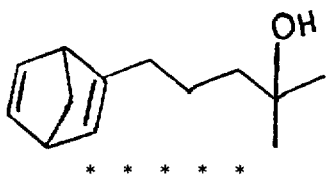

* * * * *